(12) United States Patent
Fan et al.

(10) Patent No.: US 11,181,954 B2
(45) Date of Patent: Nov. 23, 2021

(54) STANDOFFS WITH REMOVABLE SPACERS

(71) Applicant: Hewlett-Packard Development Company, L.P., Spring, TX (US)

(72) Inventors: Yao-Wen Fan, Taipei (TW); Yu-Wei Tan, Taipei (TW); Sheng-Lung Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,679

(22) PCT Filed: Sep. 20, 2018

(86) PCT No.: PCT/US2018/051946
§ 371 (c)(1),
(2) Date: Oct. 19, 2020

(87) PCT Pub. No.: WO2020/060554
PCT Pub. Date: Mar. 26, 2020

(65) Prior Publication Data
US 2021/0255673 A1    Aug. 19, 2021

(51) Int. Cl.
*G06F 1/18*    (2006.01)
*G06F 1/16*    (2006.01)
(52) U.S. Cl.
CPC ............. *G06F 1/183* (2013.01); *G06F 1/181* (2013.01); *G06F 1/1658* (2013.01)
(58) Field of Classification Search
CPC .................................................. G02F 1/1333
See application file for complete search history.

(56) References Cited

U.S. PATENT DOCUMENTS

| | | | |
|---|---|---|---|
| 5,881,979 A | 3/1999 | Rozier, Jr. et al. | |
| 6,256,075 B1 | 7/2001 | Yang | |
| 7,561,423 B2 | 7/2009 | Turusaki et al. | |
| 7,856,732 B2 | 12/2010 | Townsend et al. | |
| 8,243,224 B2 * | 8/2012 | Kameoka | G06F 1/1601 349/58 |
| 2013/0240688 A1* | 9/2013 | Schwartz | A47B 91/024 248/125.8 |

FOREIGN PATENT DOCUMENTS

| | | |
|---|---|---|
| CN | 201349768 Y | 11/2009 |
| CN | 204377298 U | 6/2015 |
| CN | 204887744 U | 12/2015 |
| KR | 20080028235 | 3/2008 |
| RU | 2011145390 A | 5/2013 |
| TW | 201305779 A | 2/2013 |

\* cited by examiner

*Primary Examiner* — Jerry Wu
(74) *Attorney, Agent, or Firm* — HP Inc. Patent Department

(57) ABSTRACT

In an example, a standoff may include a bracket, a post attachable to the bracket, and a spacer removably attachable to the post. The post may include a first portion having a first diameter, and a second portion having a second diameter larger than the first diameter of the first portion of the post. The spacer may include a first portion having a first internal diameter at a first end of the spacer, and a second portion having a second internal diameter at a second end of the spacer opposite the first end, wherein the second internal diameter is larger than the first internal diameter of the first portion of the spacer.

7 Claims, 6 Drawing Sheets

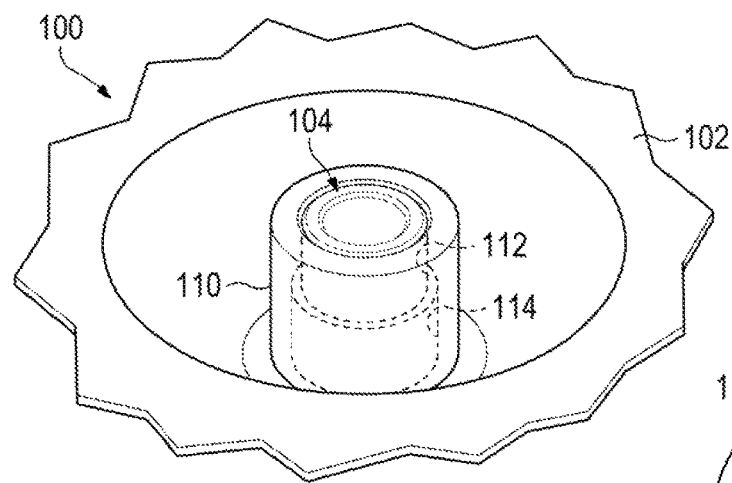
FIG. 1A
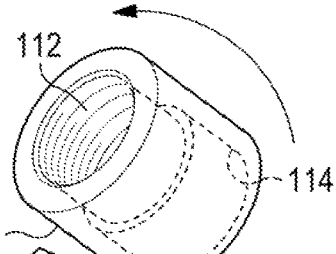
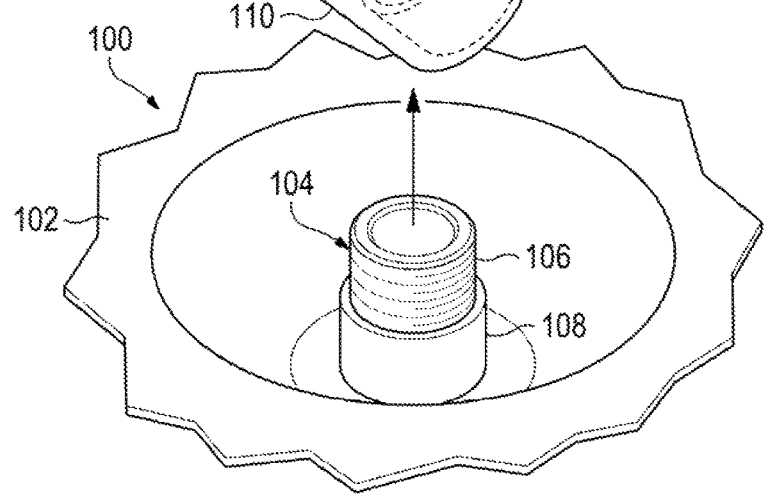
FIG. 1B
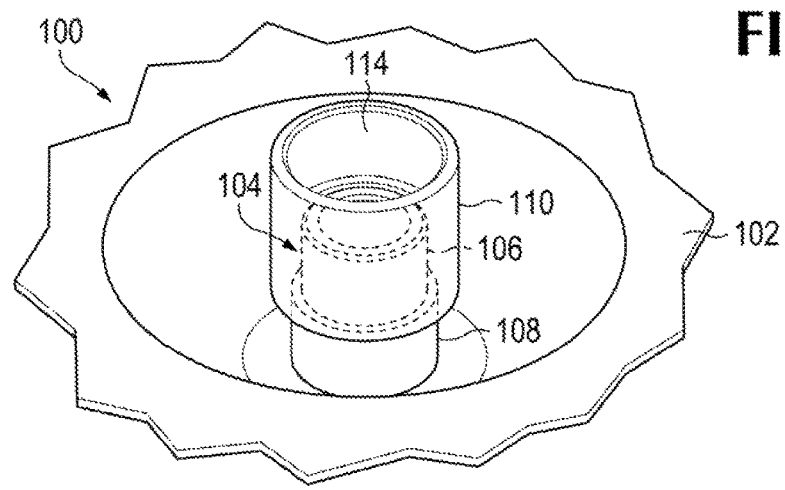
FIG. 1C

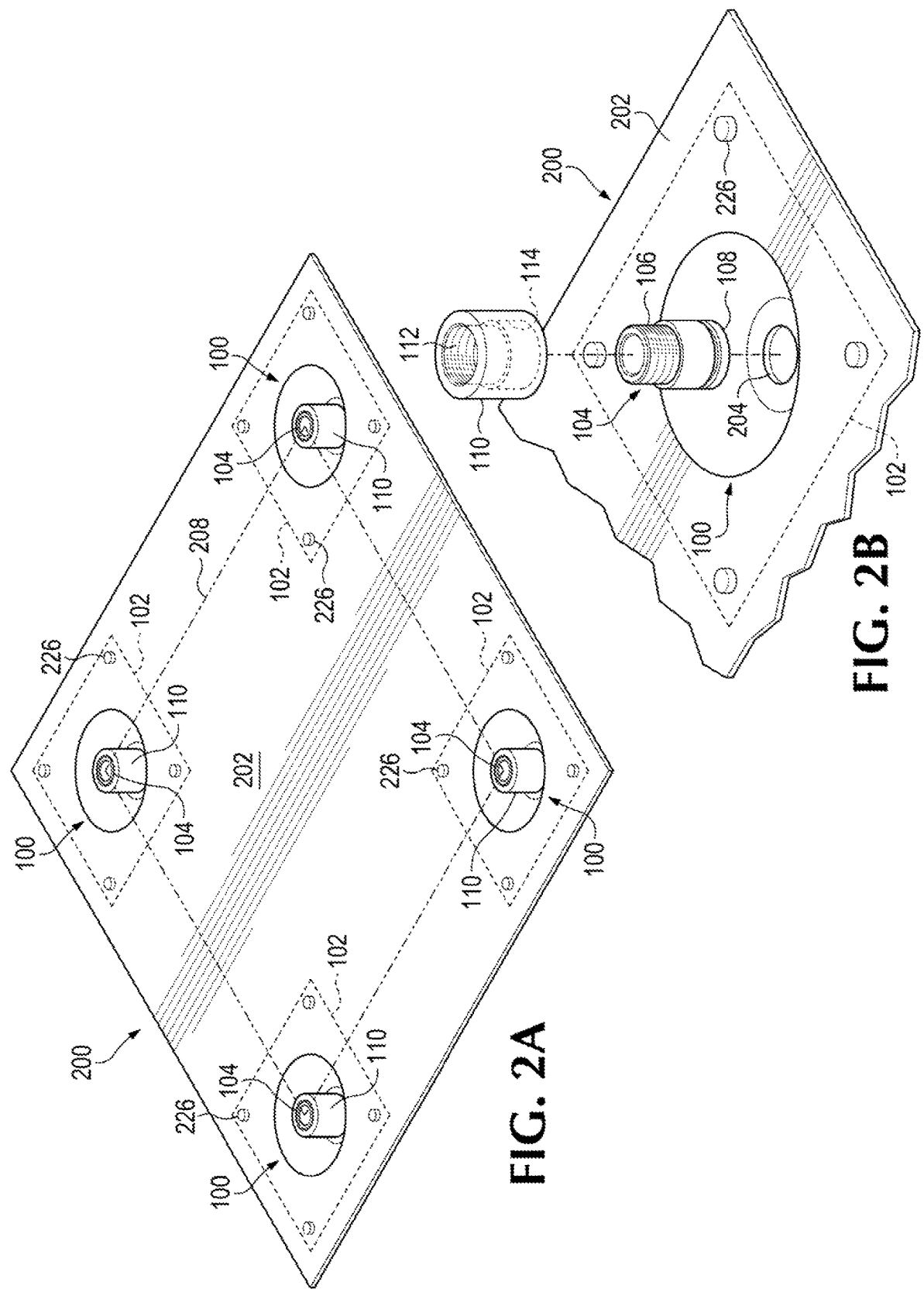

STANDOFFS WITH REMOVABLE SPACERS

BACKGROUND

Electronic devices may have a housing or enclosure within which components of the electronic device may be disposed. Such electronic devices, and thus enclosures thereof, may be continually reducing in size and/or footprint to make the electronic device more compact, sleek, and/or desirable to an end user. Additionally, electronic devices may include mounting structures and/or components to either mount an accessory to the electronic device, or to mount the electronic device to another device or stand.

BRIEF DESCRIPTION OF THE DRAWINGS

FIGS. 1A-C is a perspective view of an example standoff;
FIGS. 2A-B is a perspective view of a mounting portion of an electronic device having an example standoff.

DETAILED DESCRIPTION

Figure 3A:
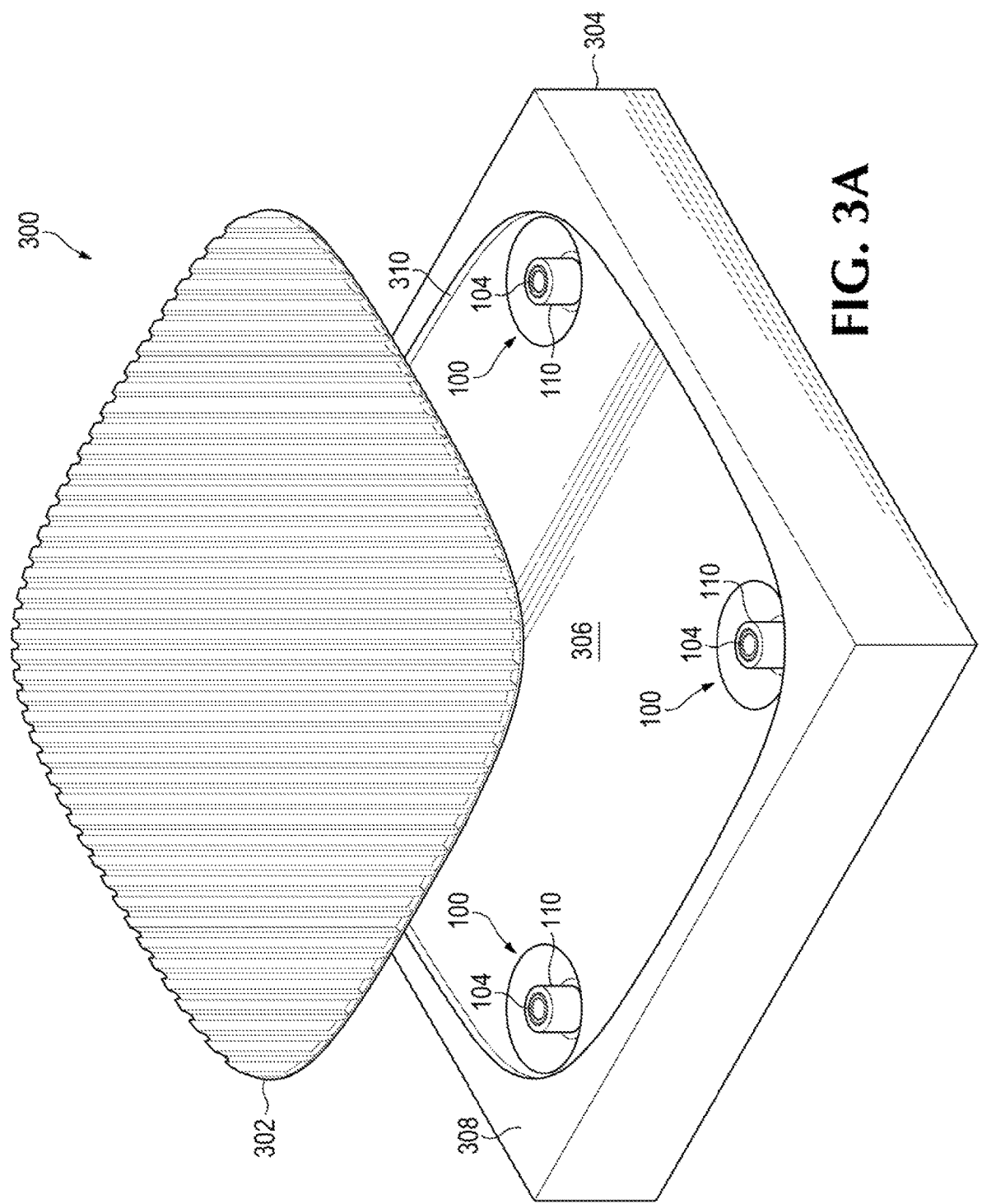
FIGS. 3A-D is a perspective view of an example electronic device having an example standoff.

Electronic devices, for example, desktop computers or workstations, are continually getting smaller and sleeker to save weight and space when using the electronic device. Additionally, electronic devices are getting smaller to achieve a better aesthetic and to be more desirable to an end user of the device. As such, space and volume within such devices, or enclosures, housings, or chasses thereof, is often at a premium, and wasting space may be undesirable. Further, it may sometimes be desirable to mount an electronic device to another device, mount, or stand, or to attach an accessory to the electronic device. As such, electronic devices may also include mounting structures and/or components to accomplish such tasks. In order to preserve the aesthetic appearance and sleek structure of an electronic device, it may be desirable to avoid having such mounting structures and components visible on the exterior of the electronic device when they are not in use, and, thus, such structures and components may be hidden within a housing or enclosure of an electronic device by a removable cover or panel.

In some situations, in order to utilize the mounting structures or components, the removable cover or panel may be removed, thereby exposing such mounting structures and components. However, since it may be desirable to maintain a sleek and attractive aesthetic of the electronic device, the removable cover may be recessed within or flush with the enclosure of the electronic device when the cover is attached. Therefore, when the cover is removed, the mounting structures or components may be recessed within the enclosure of the electronic device, in order to provide clearance for the removable cover or panel. As such, in some situations, attaching an accessory or a device to such mounting structures may be difficult, since the mounting structures may be recessed, at least partially, within the enclosure of the electronic device. In some situations, a spacer or adapter may be utilized with the mounting structures or components to effectively raise the attachment point to an accessory outside of the enclosure, however this may add cost and complexity to the electronic device.

Therefore, in some situations, it may be desirable to have mounting structures or components for an electronic device that may be hidden within an enclosure of the electronic device when not in use, and which may extend to an exterior of the electronic device when it is desirable to utilize the mounting structures or components, so as to make it easier to attach the electronic device to an accessory or other additional device.

Implementations of the present disclosure provide standoffs for the mounting of electronic devices to accessories or other devices. Examples of standoffs disclosed herein may be recessed within an enclosure of a device when not in use while the standoffs are in a first position, and may be switched to a second position in order to protrude from the enclosure when it is desirable to utilize such standoffs.

Referring now to FIG. 1A, a perspective view of an example standoff 100 is illustrated. Standoff 100 may include a post 104 attachable to a bracket 102. The bracket 102, in some implementations, may be a substantially planar structure such as a plate, board, chassis, or a portion thereof. In some implementations, the bracket 102 may be a part of such a component that may already be a part of an electronic device, such as a chassis, housing, or board. In other implementations, the bracket 102 may be a standalone, dedicated component that is part of the standoff 100, and may be attached to another component, structural or other, of an electronic device in which the standoff 100 may be implemented. The bracket 102 may have a post opening (not shown) to receive the post 104, or a portion thereof. The post opening may be a window, cutout, aperture, or other type of opening that extends through a thickness of the bracket 102 and is sized sufficiently to receive the post 104, or a portion thereof.

As an example, the post 104 includes a first portion 106 having a first diameter, and a second portion 108 having a second diameter larger than the first diameter of the first portion 106 of the post 104 (e.g., see FIG. 1B). The larger diameter of the second portion 108 may be a portion or feature disposed on the post 104, and may be a shelf, ledge, protrusion or another feature having an edge and an associated plane which could support another component, such as spacer 110 that removably attaches to the post 104, for example, in a first and second position.

As an example, the spacer 110 includes a first portion 112 having a first internal diameter at a first end of the spacer 110. In addition, the spacer 110 includes a second portion 114 having a second internal diameter at a second end of the spacer 110 opposite the first end. As illustrated, the second internal diameter is larger than the first internal diameter of the first portion 112 of the spacer 110. Referring to the spacer 110 as it transitions from the first position illustrated in FIG. 1A to the second position illustrated in FIG. 1C, the first portion 112 of the spacer 110 is attachable to the first portion 106 of the post 104 via either the first end or second end of the spacer 110. As an example, the first portion 112 of the spacer 110 is screwable to the first portion 106 of the post, and the first internal diameter of the first portion 112 of the spacer is less than the second diameter of the second portion 108 of the post 104. As a result, as mentioned above, the second portion 108 of the post 104 may support the spacer 110 as it attaches to the post 104, as illustrated in FIG. 1A or FIG. 1C. As an example, the spacer 110 and the post 104 may have complementary features to support the first portion 112 of the spacer 110 being fastened and/or fixed to the first portion 106 of the post 104. For example, the post 104 and the spacer 110 may have complementary threads. In other implementations, the spacer 110 may be attached to the post 104 in another manner, e.g., using a press fit or interference fit, or with a cross pin, etc.

As will be further described, when the spacer 110 is attached to the post 104 via the second end of the spacer 110, as illustrated in FIG. 1A, the first end of the spacer 110 is flush with or below a plane of the bracket 102. However, when the spacer 110 is flipped over (e.g., see FIG. 1B) and attached to the post 104 via the first end of the spacer 110, as illustrated in FIG. 1C, the second end of the spacer 110 is above the plane of the bracket 102. As an example, when the second end of the spacer 110 is above the plane of the bracket 102, an electronic device utilizing the standoff 100 makes it easier to attach the electronic device to an accessory or other additional device.

Referring now to FIG. 2A, a perspective view of a mounting portion 200 of an electronic device having a plurality of example standoffs 100 is illustrated. Note, in some implementations, the mounting portion 200 may have a different number of example standoffs 100 than as illustrated, including having just a single example standoff 100. Referring additionally to FIG. 2B, a detail view of the example mounting portion 200 is illustrated, wherein one of the plurality of standoffs 100 is illustrated in an exploded state.

The mounting portion 200 may include a plate 202 having a plurality of standoff openings 204. The plate 202 may be a rigid or semi-rigid member or panel. In some implementations, the plate 202 may be a standalone component to which the plurality of standoffs 100 are attached. In other implementations, the plate 202 may be an integrated part or component of an electronic device, such as a frame, housing, chassis, circuit board, or a portion or portions thereof. The plurality of standoff openings 204 may be arranged in a mounting pattern on the plate, illustrated by pattern 208. Similarly, the plurality of example standoffs 100 may also be arranged in such a mounting pattern 208 such that each of the plurality of standoffs 100, or a bracket 102 thereof, is aligned with one of the plurality of standoff openings 204. In some implementations, the mounting pattern 208 may be any pattern suitable to align the plurality of standoffs 100 with matching or complementary mounting points or features on an accessory or device to which the mounting portion 200, and thus an electronic device in which the mounting portion 200 is implemented, is to be attached or mounted. In further implementations, the mounting pattern 208 may be an industry standard mounting pattern, such as a Video Electronics Standards Association (VESA) Mounting Interface Standard (MIS). In yet further implementations, the mounting pattern 208 may be a rectangular arrangement having dimensions of approximately 100 mm×100 mm, 100 mm×50 mm, 100 mm×200 mm, 200 mm×50 mm, or another suitable industry standard mounting pattern.

Each example standoff 100, including bracket 102, may be disposed on or attached to an underside of the plate 202, and thus is illustrated in hidden lines. In other implementations, the bracket 102 may be an integral part of the plate 202, or a portion of the plate 202 may act as the bracket 102, and a discrete or standalone bracket 102 may be omitted from the standoff 100. The bracket 102 may have a post opening (not shown), which may be aligned with a respective one of the plurality of standoff openings 204. Each of the plurality of standoff openings 204 may be a window, cutout, aperture, or other opening extending through a thickness of the plate 202. Thus, a post 104 of each of the plurality of standoffs 100 may be insertable into the post opening, and also the respective standoff opening 204 with which the post opening is aligned.

In some implementations, the bracket 102 of each of the plurality of standoffs 100 may be attached to the plate 202 by a plurality of rivets 226. In some implementations, the rivets 226 may be a part of the bracket 102, and insertable into complementary openings in the plate 202, and in other implementations, the rivets 226 may be a part of the plate 202 and insertable into complementary openings in the bracket 102. Once engaged with a complementary opening, each rivet may be pressed, stamped, or otherwise deformed to overlap the opening and retain the bracket 102 to the plate 202.

Referring now to FIG. 3A, a perspective view of an example electronic device 300 having a plurality of example standoffs 100 is illustrated. The electronic device 300, in some implementations, may be a computing device. In further implementations, the electronic device 300 may be a desktop personal computer (PC), a mini-desktop PC, an external PC accessory or expansion component, e.g., a graphics card, or another type of computing device or component. In other implementations, the electronic device 300 may be any type of electronic device with which it may be desirable to mount an accessory, e.g., a router, modem, cable box, uninterruptible power supply (UPS) or another type of electronic device.

The plurality of standoffs 100 may be arranged in a mounting pattern on a mounting portion 306 of the electronic device 300. Further, the electronic device 300 may have a chassis 304 having a mounting side 308. The mounting portion 306 may be disposed on the mounting side 308, and, in some implementations, may be at least partially disposed or recessed within the chassis 304. The chassis 304 may also house and support other components of the electronic device 300 including, but not limited to, circuit boards, processors, memory, power supplies, communication ports, hard drives, batteries, and/or other suitable components. The electronic device 300 may also have a mounting cover 302 which may removably attach or couple to the chassis 304. The chassis 304 may include a mounting cover recess 310 disposed over the mounting portion 306 to receive the mounting cover 302 within the mounting cover recess 310. The mounting cover 302 may be attachable to the electronic device 300 so as to conceal the mounting portion 306 and the plurality of standoffs 100 if they are not to be utilized. In other words, when each of the plurality of standoffs 100 are in an unused position (e.g., see FIG. 1A), they may sit flush with, or below the mounting cover recess 310 such that the mounting cover 302 may sit within the recess and lie flush or flat with the rest of the chassis 304. As a result, when the mounting cover 302 is attached, the aesthetic and attractiveness of the chassis and the electronic device 300 as a whole may be preserved.

Figure 3B:
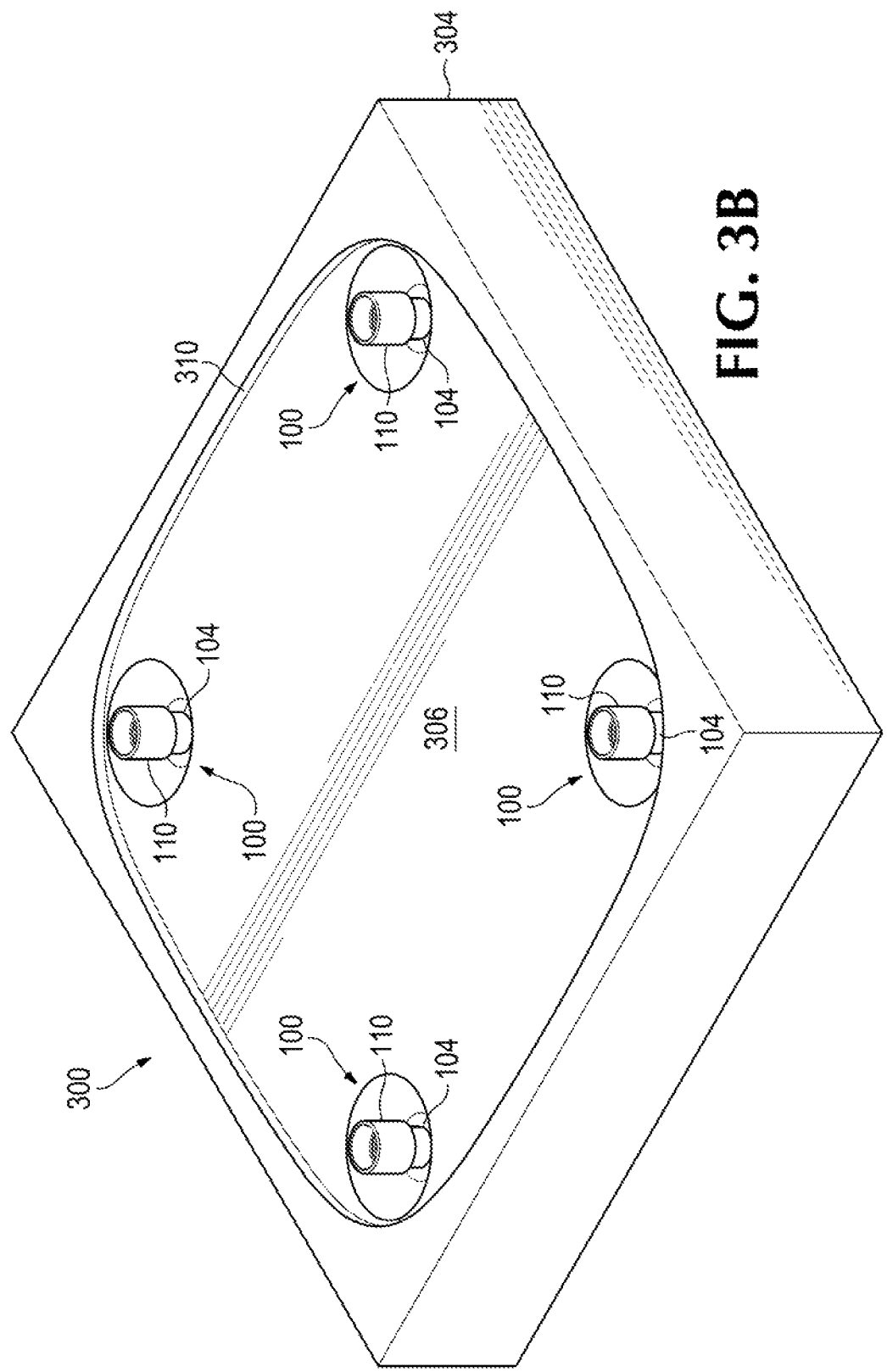

Referring now to FIG. 3B, a perspective view of the electronic device 300 is illustrated wherein the mounting cover 302 has been removed, thereby exposing the plurality of standoffs 100, and the spacer 110 of each standoff 100 has been flipped over to the position illustrated in FIG. 1C. In the raised position illustrated, the spacer 110 of each of the plurality of standoffs 100 may extend beyond the chassis 304 and out of the mounting cover recess 310. Thus, each standoff 100 is now retained in the raised position and able to engage with a mounting point or component of an accessory outside of the chassis 304 without the use of an adapter plate.

Figure 3C:
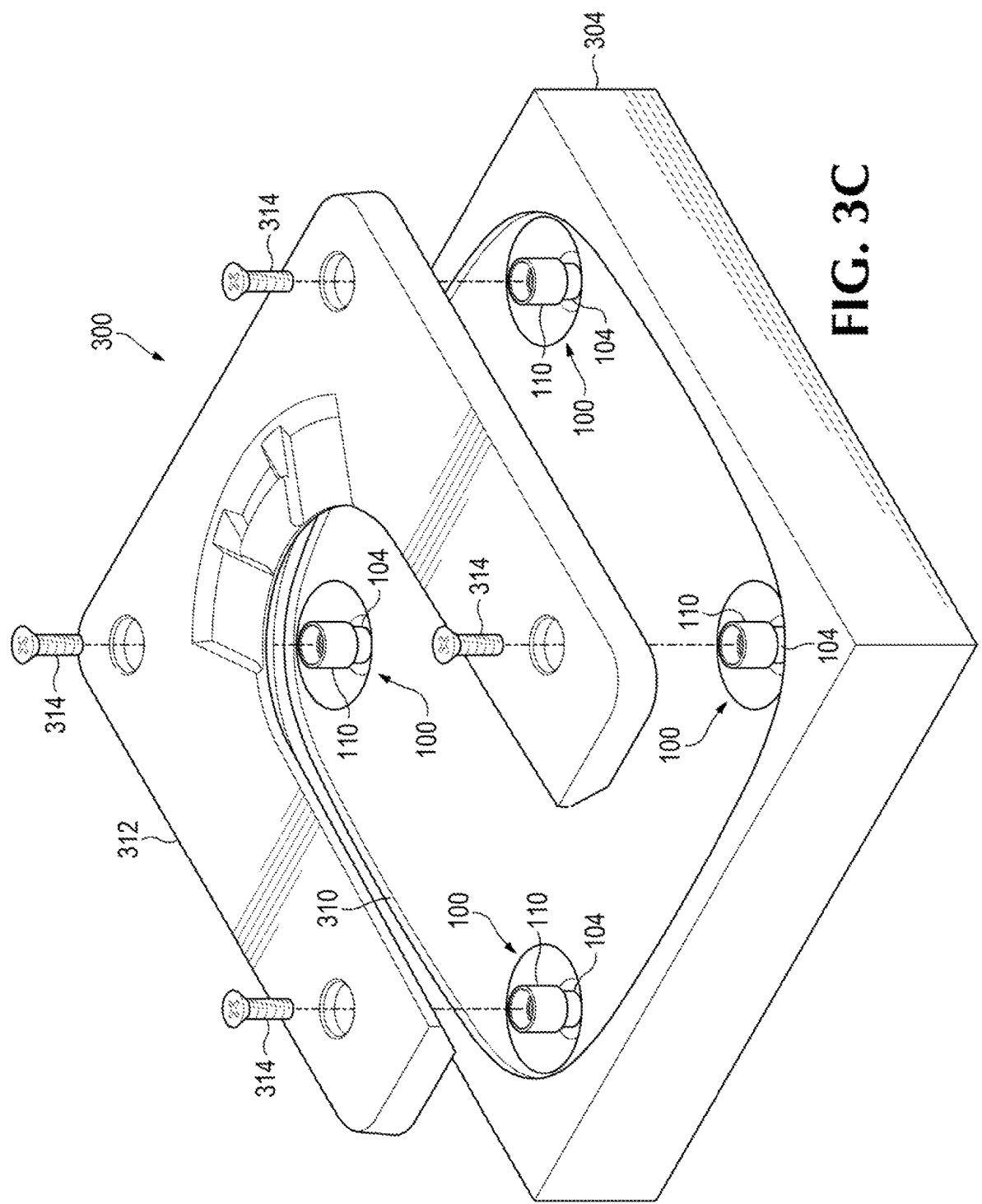
Figure 3D:
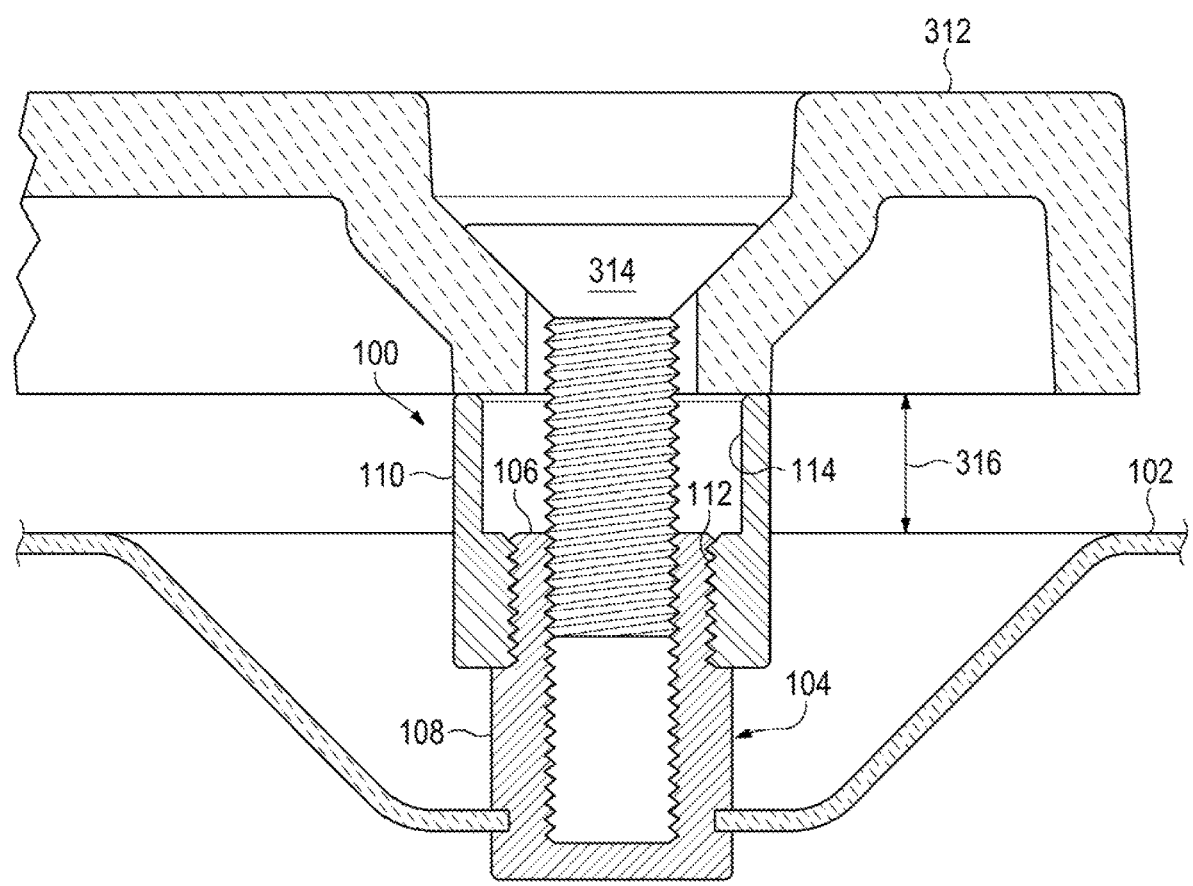

Referring additionally to FIG. 3C, the electronic device 300 is illustrated as engaging with an accessory 312. The accessory 312 may be any component for which it might be desirable to have attached to the electronic device 300. For example, the accessory 312 may be a wall mount, monitor mount, stand, desk mount, or portions or brackets thereof. In other implementations, the accessory 312 may be another type of component, or another electronic device. The accessory 312 may be attached to the post 104 of each standoff 100 using a fastener 314, each of which may engage with and/or be received by a fastener aperture (not shown) of the respective post 104. Referring additionally to FIG. 3D, a cross-sectional view of one of the plurality of standoffs 100 of the electronic device 300 is illustrated as being fully engaged or attached to an accessory 312 with a fastener 314. The fastener 314 may rigidly mount a portion of the accessory 312 to a mounting surface of the spacer 110. Thus, the accessory 312 may be rigidly attached to the electronic device 300 by being attached to each or some of the standoffs 100.

As described above, when the spacer 110 of each of the standoffs 100 is flipped over and disposed in the raised position, each spacer 110 may extend out of the mounting cover recess 310 so as to enable the simple and easy attachment of the accessory 312. As illustrated in FIG. 3D, due to such an extension of the spacer 110, when attached to the electronic device 300, a lower-most portion of the accessory 312 may be spaced apart from a surface of the chassis 304, for example, from an upper-most surface of bracket 102, by distance 316. As a result, the use of an adapter plate may be avoided when attaching electronic devices to an accessory.

What is claimed is:

1. A standoff comprising: a bracket; a post attachable to the bracket, the post comprising: a first portion having a first diameter; and a second portion having a second diameter larger than the first diameter of the first portion of the post; and a spacer removably attachable to the post, the spacer comprising: a first portion having a first internal diameter at a first end of the spacer; and a second portion having a second internal diameter at a second end of the spacer opposite the first end, wherein the second internal diameter is larger than the first internal diameter of the first portion of the spacer; and the first internal diameter of the first portion of the spacer is less than the second diameter of the second portion of the post; and when the spacer is attached to the post via the second end of the spacer, the first end of the spacer is flush with or below a plane of the bracket; and when the spacer is attached to the post via the first end of the spacer, the second end of the spacer is above the plane of the bracket.

2. The standoff of claim 1, wherein the first portion of the spacer is attachable to the first portion of the post via either the first end or the second end of the spacer.

3. The standoff of claim 2, wherein the first portion of the spacer is screwable to the first portion of the post.

4. A mounting portion of an electronic device, the mounting portion comprising: a plate having a plurality of standoff openings; and a plurality of standoffs arranged in a mounting pattern, each standoff comprising: a bracket aligned with one of the plurality of standoff openings; a post attachable to the bracket, the post comprising: a first portion having a first diameter; and a second portion having a second diameter larger than the first diameter of the first portion of the post; and a spacer removably attachable to the post, the spacer comprising: a first portion having a first internal diameter at a first end of the spacer; and a second portion having a second internal diameter at a second end of the spacer opposite the first end, wherein the second internal diameter is larger than the first internal diameter of the first portion of the spacer; and wherein the first internal diameter of the first portion of the spacer is less than the second diameter of the second portion of the post; and when the spacer is attached to the post via the first end of the spacer, the second end of the spacer is above a plane of the bracket; and when the spacer is attached to the post via the second end of the spacer, the second end of the spacer is flush with or below a plane of the bracket.

5. The mounting portion of claim 4, wherein the first portion of the spacer is attachable to the first portion of the post via either the first end or the second end of the spacer.

6. An electronic device comprising: a chassis; and a mounting portion disposed on a mounting side of the chassis, the mounting portion comprising: a plurality of standoffs arranged in a mounting pattern, each standoff comprising: a post attachable to the mounting portion, the post comprising: a first portion having a first diameter; and a second portion having a second diameter larger than the first diameter of the first portion of the post and a spacer removably attachable to the post, the spacer comprising: a first portion having a first internal diameter at a first end of the spacer; and a second portion having a second internal diameter at a second end of the spacer opposite the first end, wherein the second internal diameter is larger than the first internal diameter of the first portion of the spacer; and the first internal diameter of the first portion of the spacer is less than the second diameter of the second portion of the post; and wherein when the spacer is attached to the post via the second end of the spacer, the first end of the spacer is flush with or below a recess on the mounting side of the chassis; and when the spacer is attached to the post via the first end of the spacer, the second end of the spacer extends beyond the chassis, out of the recess.

7. The electronic device of claim 6, wherein the first portion of the spacer is attachable to the first portion of the post via either the first end or the second end of the spacer.

* * * * *